United States Patent [19]

Kubo et al.

[11] Patent Number: 4,580,214

[45] Date of Patent: Apr. 1, 1986

[54] MEMORY CONTROL SYSTEM

[75] Inventors: Kanji Kubo; Noriaki Hashimoto, both of Hadano, Japan

[73] Assignee: Hitachi, Ltd., Tokyo, Japan

[21] Appl. No.: 460,807

[22] Filed: Jan. 25, 1983

[30] Foreign Application Priority Data

Mar. 2, 1982 [JP] Japan .................................. 57-32576

[51] Int. Cl.⁴ ............................................ G06Z 9/34
[52] U.S. Cl. ...................................... 364/200; 364/900
[58] Field of Search ... 364/200 MS File, 900 MS File

[56] References Cited

U.S. PATENT DOCUMENTS

| | | | |
|---|---|---|---|
| 3,824,561 | 7/1974 | Wolf .................................. | 364/200 |
| 3,999,052 | 12/1976 | Gooding et al. ...................... | 364/200 |
| 4,270,181 | 5/1981 | Tamakura et al. .................... | 364/200 |
| 4,314,332 | 2/1982 | Shiraogawa et al. ................. | 364/200 |
| 4,374,410 | 2/1983 | Sakai et al. .......................... | 364/200 |
| 4,408,275 | 10/1983 | Kubo et al. .......................... | 364/200 |
| 4,454,578 | 6/1984 | Matsumoto et al. ................. | 364/200 |
| 4,506,345 | 3/1985 | Boothroyd et al. ................. | 364/900 |

Primary Examiner—James D. Thomas
Assistant Examiner—Thomas Lee
Attorney, Agent, or Firm—Antonelli, Terry & Wands

[57] ABSTRACT

The present memory control system fetches data blocks from memories, fetches data corresponding to the unit of processing in the execution unit from the data blocks, and transfers the data to the execution unit. Data blocks fetched from the memories are held in first hold device. The data blocks held in the first hold device are transferred to second hold device via gate. The gate selectively transfers all or a part of data in data blocks held by the first hold device to the second hold device. When a part of data held in the first hold device is transferred, the second hold device forms data blocks by using the data previously held and the data newly transferred from the first hold device. A data fetch device fetches the data corresponding to the unit length of data processing in the execution unit from the data blocks held in said second hold device and transfers the data to said execution unit.

12 Claims, 17 Drawing Figures

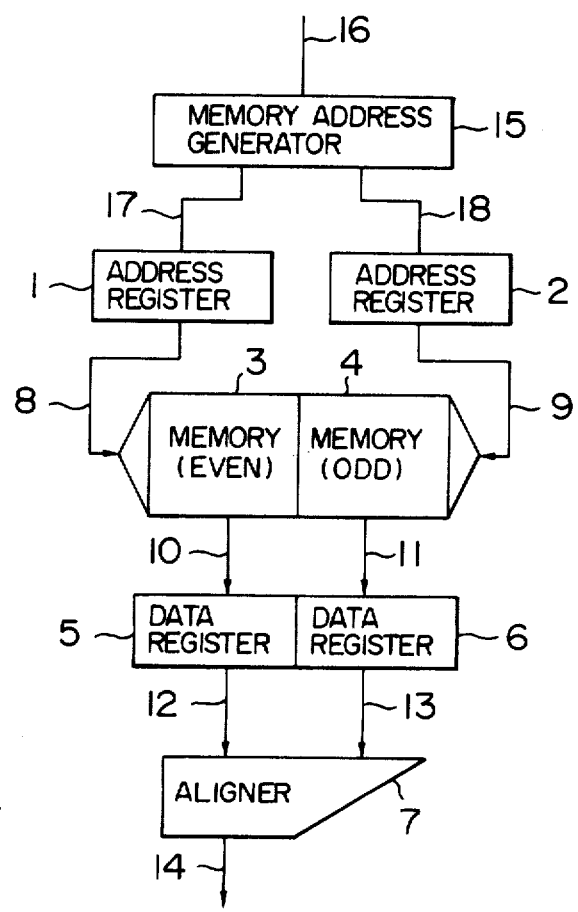

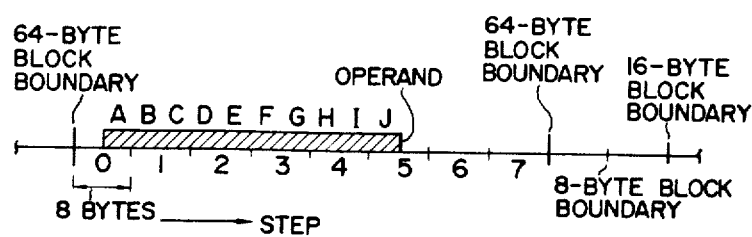
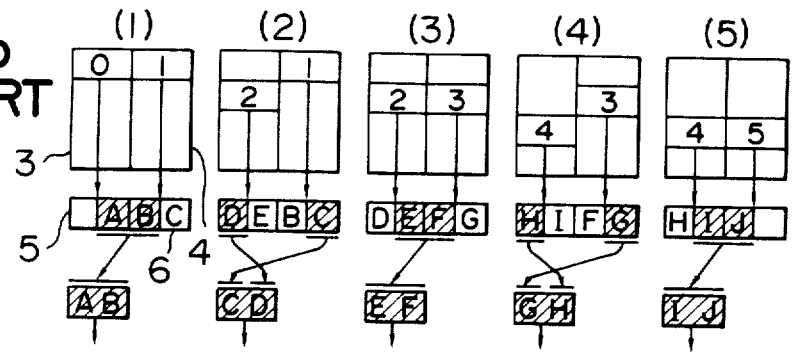
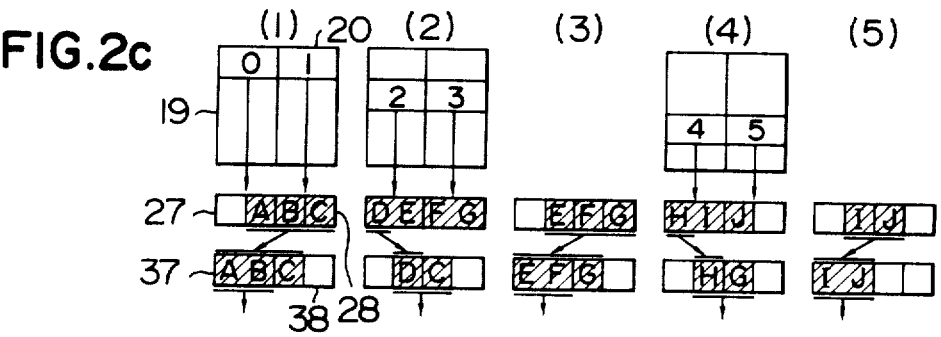
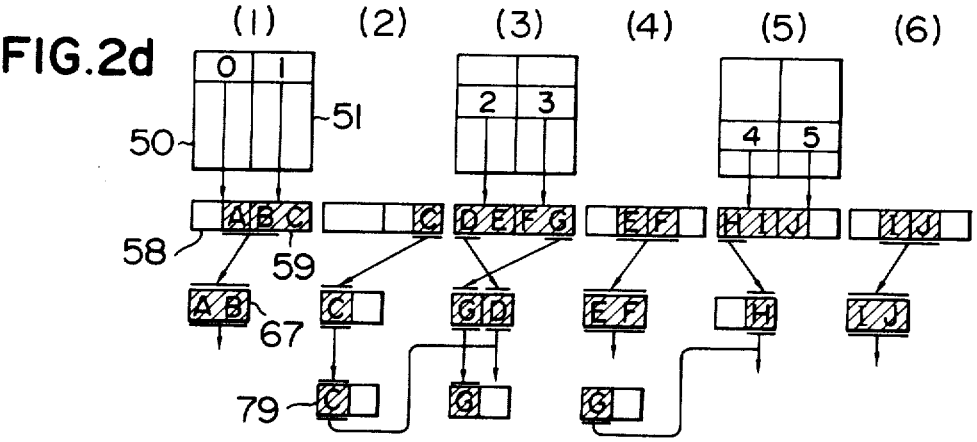

| A B C D | HEX | MDR27 | MDR28 | FDR 37 | FDR 38 |
|---|---|---|---|---|---|
| 0 0 0 0 | 0 | NOT BUSY | NOT BUSY | NOT BUSY | NOT BUSY |
| 0 0 0 1 | 1 | NOT BUSY | FULL BUSY | NOT BUSY | NOT BUSY |
| 0 0 1 0 | 2 | FULL BUSY | FULL BUSY | NOT BUSY | NOT BUSY |
| 0 0 1 1 | 3 | NOT BUSY | NOT BUSY | NOT BUSY | FULL BUSY |
| 0 1 0 1 | 5 | HALF BUSY | FULL BUSY | NOT BUSY | NOT BUSY |
| 0 1 1 0 | 6 | FULL BUSY | FULL BUSY | NOT BUSY | HALF BUSY |
| 0 1 1 1 | 7 | HALF BUSY | FULL BUSY | NOT BUSY | NOT BUSY |
| 1 0 0 0 | 8 | NOT BUSY | HALF BUSY | NOT BUSY | NOT BUSY |
| 1 0 0 1 | 9 | FULL BUSY | FULL BUSY | HALF BUSY | NOT BUSY |

MEMORY CONTROL SYSTEM

BACKGROUND OF THE INVENTION

The present invention relates to a memory control system for a data processing system wherein operands are placed in the memory and fetched as occasion demands that they be executed, and in particular to a memory control system for a data processing system wherein it is allowed to place an operand in an arbitrary address and the length of the operand is allowed to exceed the unit length of processing in the execution unit. More particularly, the present invention is applied to a data processing system equipped with a so-called alignment mechanism whereby such an operand placed in an arbitrary address can be displaced to specified positions suited to the execution unit and then be fetched.

An example of data processing system equipped with an alignment mechanism is disclosed in Japanese Patent Application Laid-Open Publication No. 94133/78. Hereafter, the data processing systen is assumed to be equipped with an alignment mechanism wherein the address is the byte address, the unit length of the memory reference is 8 bytes and the maximum unit of processing in the execution unit is also 8 bytes. In this case, for deriving a desired operand at the first memory reference even if the operand is spread over an 8-byte boundary, i.e., over a boundary between adjacent 8-byte blocks, two consecutive 8-byte blocks are fetched by each memory reference. The 8-byte block refers to a continuous area composed of 8 bytes having the leading address which is a multiple of 8 and memory reference is effected on the unit of the 8-byte block. Since the unit of processing in the execution unit is 8 bytes, at least half of the 16-byte data which has been fetched must be discarded without being processed. In processing an instruction having a long operand exceeding 8 bytes, execution in the execution unit is effected for 8 bytes at a time while 16 bytes are fetched from the memory for the 8-byte data to be processed in the execution unit. Assuming that an address with a smaller value is referenced earlier, the reference address increments only by 8 bytes at a time. As a result, intermediate 8-byte blocks other than 8-byte blocks to which both ends of the operand belong are fetched twice.

FIG. 1 shows the schematic construction of an example of a memory control unit in a conventional data processing system having such an alignment mechanism. The memory illustrated in FIG. 1 is a buffer memory. The buffer memory is a memory having a smaller capacity and faster speed compared with the main memory which is not illustrated. The buffer memory holds a part of data held by the main memory. By placing data frequently used in the buffer memory, the execution unit can utilize data from the buffer memory rapidly. The unit of capacity placed in the buffer memory as the copy of contents in the main memory is 64 bytes specified by the address. In FIG. 1, numeral 1 denotes an address register for fetching an 8-byte block having an even address within the 64-byte block and numeral 2 denotes an address register for fetching an 8-byte block having an odd address within the 64-byte block. Numeral 3 is a memory for storing an 8-byte block having an even address within the 64-byte block and numeral 4 is a memory for storing an 8-byte block having an odd address within the 64-byte block. The address registers 1 and 2 are connected to memories 3 and 4 respectively by address lines 8 and 9. Numerals 5 and 6 are data registers for storing 8-byte data each which have been fetched respectively from the memories 3 and 4. The data registers 5 and 6 are connected to the memories 3 and 4 respectively by data lines 10 and 11. The data lines 10 and 11 may also serve to transfer the data which has been fetched in memory reference excepting operand fetch toward another register or the like. However, destinations of the data lines 10 and 11 for the just described purpose are omitted in FIG. 1. Numeral 7 denotes an aligner for moving a desired operand within the memory data which has been stored in the data registers 5 and 6 to render it left justified or right justified. The aligner 7 is connected to the data registers 5 and 6 via data lines 12 and 13. The operand aligned by the aligner 7 or a part thereof is sent out to the execution unit via a data line 14. Numeral 15 denotes a memory address generator having an operand address line 16 as its input and memory address lines 17 and 18 as its output. The memory address generator 15 functions to generate a memory address for an 8-byte block indicated by an operand fetch address on the operand address line 16 and a memory address for the next 8-byte block and to send out the even memory address onto the memory address line 17 and the odd memory address onto the memory address line 18. The memory address lines 17 and 18 are respectively connected to address registers 1 and 2. For the conventional data processing system having the alignment mechanism as illustrated in FIG. 1, processing for an operand which is spread over an 8-byte boundary will be described referring to FIG. 2.

In FIG. 2a, the shaded region represents an operand composed of 40 bytes in the memory. This memory is divided into blocks respectively composed of 64 bytes. The above described operand starts half-way on the first 8-byte block within this 64-byte block and ends in the middle of the sixth 8-byte block. In FIG. 2a, addresses 0 to 7 within the 64-byte block are assigned to respective 8-byte blocks. Denoting an 8-byte block having an address within the 64-byte block of 0 by 8-byte block 0, an 8-byte block having the address within the 64-byte block of 1 by 8-byte block 1, an 8-byte block having the address within the 64-byte block of 2 of 8-byte block 2, - - -, and an 8-byte block having the address within the 64-byte block of 7 by 8-byte block 7, the shaded 40-byte operand starts at the center of 8-byte block 0 and ends at the center of the 8-byte block 5.

In the conventional data processing system having an alignment mechanism, this operand is fetched in five steps as illustrated in FIG. 2b. In FIG. 2b, said 64-byte block and two data registers 5 and 6 for storing 8-byte data fetched from the memory are illustrated for each step. To be readily understandable, 8-byte blocks having an even address within said 64-byte block are piled up vertically in the left half of the 64-byte block and are stored in the memory 3, 8-byte blocks having an odd address are piled up vertically in the right half and are stored in the memory 4 and only the 8-byte blocks under notice are enclosed by frames and provided with addresses within the 64-byte block. At first in the step (1), for sending out the eight leftmost bytes of said operand to the execution unit, 8-byte blocks 0 and 1 of said 64-byte block are fetched respectively from the memories 3 and 4 and are stored into data registers 5 and 6, respectively. The desired 8-byte data (A and B) is stored in the middle of these data registers 5 and 6 as shaded in FIG. 2b. The contents of these data registers 5 and 6 are left justified by the aligner 7 illustrated in FIG. 1 and are sent out to the execution unit. In step (2), for sending out eight bytes ranging from the ninth byte when counted from the leftmost end of the operand until sixteenth byte toward the execution unit, 8-byte blocks 1 and 2 are fetched to be stored into the data registers 5 and 6. The desired 8-byte data (C and D) is stored in both ends of these data registers 5 and 6 as shaded in FIG. 2b. The contents of these data registers are subjected to cyclic shift in the aligner 7 to be left justified and are sent out to the execution unit. The similar procedures are repeated and said operand composed of A to J is completely sent out to the execution unit in a total of five steps. As evident from the above description, all of the intermediate 8-byte blocks 1 to 4 are fetched twice while 8-byte blocks 0 and 5 at the ends of the operand are fetched only once. In fetching the intermediate 8-byte blocks 1 to 4 twice, only a part of the data which has been fetched is sent out to the execution unit and the remaining part is discarded.

As described above, in the conventional data processing system having an alignment mechanism, the same memory area is referenced twice when a long operand is to be fetched. Accordingly, the average amount of memory reference per instruction is large as compared with the data processing system having no alignment mechanism. Therefore, the performance per unit memory throughput might be inferior in the data processing system having an alignment mechanism.

A memory is usually divided into blocks respectively composed of 32 to 128 bytes. In the above example, the block is composed of 64 bytes. If an operand is spread over two blocks, data in two blocks must be fetched separately. Fetch processing of such an operand which is spread over a boundary between blocks will be hereafter referred to as BX (Block Cross) processing. When the necessity of BX processing is brought about in the conventional data processing system, a memory reference must be effected twice. Accordingly, in a program wherein the BX processing is frequently used, the average amount of memory reference is increased. In addition, an extra time is consumed for effecting the memory reference twice. Thus, the BX processing is one of the causes of performance deterioration. This situation will be described referring to an example illustrated in FIG. 3.

The shaded region in FIG. 3a is an operand which is 40 bytes long and is spread over a boundary between 64-byte blocks. As illustrated in FIG. 3b, this operand is fetched in six steps. In steps (1) and (2), the first 8-bytes (A and B) when the operand is divided at intervals of eight bytes into six sections and the second eight bytes (C and D) are respectively fetched. The details are similar as those in FIG. 2b and hence will not be described. The third 8 bytes of the operand are spread over the boundary between 64-byte blocks and are fetched in two steps (3) and (4). That is to say, the 8-byte block 7 within the 64-byte block to which the left half (E) of the third 8 bytes of the operand belongs is fetched into the data register 6. The desired data (E) shaded in FIG. 3b is aligned by the aligner 7. Subsequently in step (4), 8-byte block 0' within the 64-byte block to which the right half (F) of the third eight bytes of the operand belongs is fetched into the data register 5. For discriminating from 8-byte blocks within the 64-byte block to which the left half of the operand belongs, the address of an 8-byte block within the 64-byte block to which the right half of the operand belongs is provided with "'". The desired data shaded in FIG. 3b is aligned by the aligner 7 and then coupled with the data which has been already aligned in the step (3). The coupled data is sent out to the execution unit. The coupling process is not illustrated. In subsequent steps (5) and (6), the remaining fourth 8 bytes (G and H) and fifth 8 bytes (I and J) are fetched, thereby the operand composed of (A) to (J) which is 40 bytes long having been entirely fetched.

As it will be seen from the above explanation, the BX processing for fetching the third 8 bytes (E and F) requires two steps (3) and (4). In addition, it should be considered that memory reference of 16 bytes is effected for each of the steps (3) and (4). As a result, in the BX processing for obtaining eight bytes within the operand, a memory reference for 32 bytes is required.

On the other hand, in the case where the memory is divided into blocks respectively composed of 64 bytes in the conventional memory control unit is illustrated in FIG. 1, the memory address generator 15 functions as follows. That is to say, the memory address generator 15 generates the memory address of the 8-byte block specified by the operand fetch address on the operand address line 16 and the memory address of the 8-byte block succeeding said 8-byte block and then sends out an even memory address among them onto the memory address line 17 and an odd memory address among them onto the memory address line 18. In the case where the operand fetch address specified by the operand address line 16 corresponds to the last 8-byte block within the 64-byte block, i.e., 8-byte block 7, however, it is generally impossible to generate the buffer address of the succeeding 8-byte block.

As heretofore described, the BX processing in the conventional data processing system always requires a memory reference twice and in addition requires a larger amount of memory reference as compared with the usual operand fetch wherein the BX processing is unnecessary. They are also causes of performance deterioration in the data processing system.

SUMMARY OF THE INVENTION

The first object of the present invention is to provide a memory control system having an alignment mechanism wherein the memory reference amount required to fetch a long operand is small as compared with the conventional memory control unit having an alignment mechanism.

The second object of the present invention is to provide a memory control system wherein the number of memory reference times and the memory reference amount especially in the BX processing required to fetch a long operand are approximately the same as those in the usual operand fetch operation.

The present invention is based upon the basic concept that when an operand which is longer than the unit data width in the memory is fetched in a data processing system having an alignment mechanism, a part of the operand to be used later is fetched from the output of the alignment mechanism, held and afterwards merged with data fetched later for yielding the desired data.

In the memory control system according to the present invention, data stored in memory is fetched by a specified data block depending upon the address signal requesting memory access fed from the execution unit, and the data corresponding to the unit of processing in the above described execution unit is fetched from the data block thus fetched and then transferred to the execution unit. And the memory control system according to the present invention comprises first hold means for holding the specified data block which has been fetched from the above described memory means, second hold means for holding the data blocks, gate means for selectively gating all or a part of the data within the data block held by the first hold means to said second hold means, means for fetching the data of a unit of processing in said execution unit from the data block held by said second hold means, and control means for controlling said gate means and said data fetch means depending upon said address signal.

BRIEF DESCRIPTION OF THE DRAWINGS

FIG. 1 is a block diagram for illustrating an example of construction of the conventional memory control unit;

FIGS. 2a-2d and FIGS. 3a-3d are diagrams for use in explaining the operations of the present invention in comparison with the operations of the prior art.

DETAILED DESCRIPTION OF THE PREFERRED EMBODIMENTS

Figure 4:
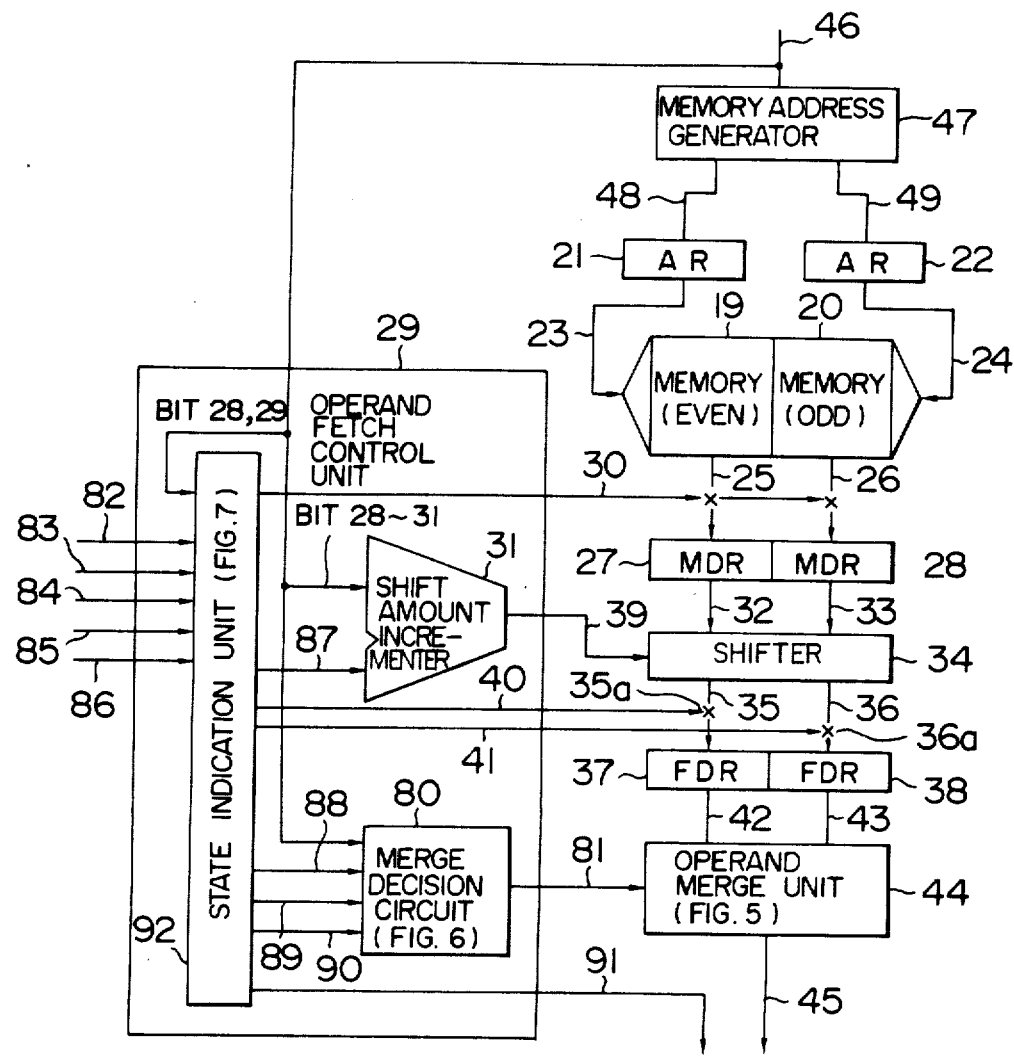
FIG. 4 is a block diagram of an embodiment of the present invention.
Figure 5:
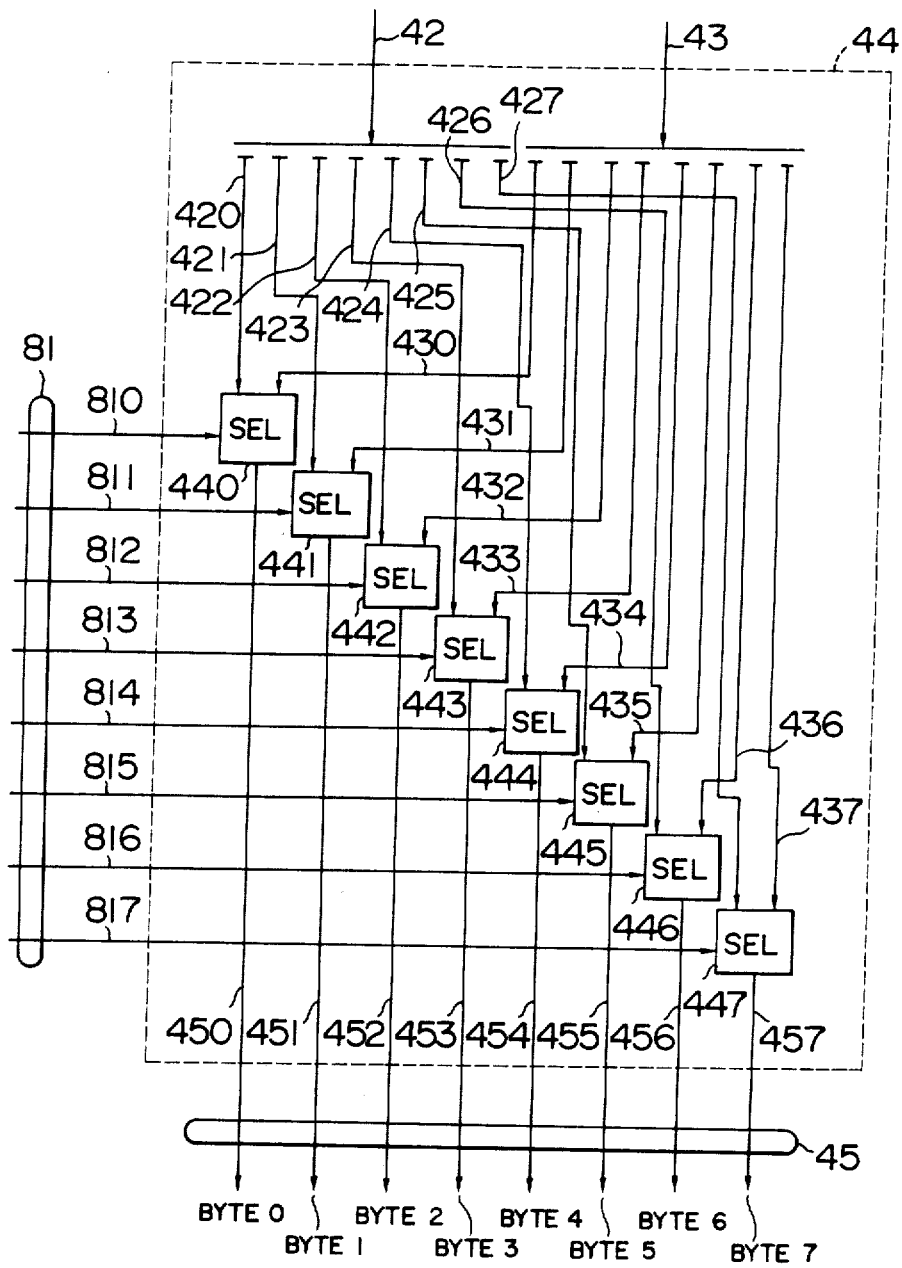
FIG. 5 shows details of an operand merge unit illustrated in FIG. 4.

FIG. 4 shows an embodiment of the memory control system according to the present invention. In FIG. 4, data is divided into blocks composed of 8 bytes. All even numbered 8-byte blocks are stored in the memory 19 and all of odd numbered 8-byte blocks are stored in the memory 20. Each of the memories 19 and 20 stores 32 bytes in the two-way interleave form. It is assumed that data stored in the memory 19 or 20 exceeding the boundary between the 64-byte blocks cannot be fetched at one time. Addresses required to refer to the memory 19 and 20 are respectively stored in address registers 21 and 22 for exclusive use and are supplied through address lines 23 and 24 to the memories 19 and 20. The 8-byte data fetched from the memory 19 is fed to a memory readout data register (MDR) 37 having a capacity of 8 bytes via a data line 25. And the 8-byte data fetched from the memory 20 is fed to a memory fetched data register (MDR) 28 having a capacity of 8 bytes via a data line 26. How to store data into MDR 27 and MDR 28 is decided by a state indication unit 92. The state indication unit 92 controls data storing via an MDR input control line 30 connected to input control terminals of MDR 27 and MDR 28 as illustrated by marks "x". Output data lines 32 and 33 of MRD 27 and MDR 28 respectively have capacities of 8 bytes and are connected to inputs of a shifter 34. The function of the shifter 34 is to left-justify or right-justify the operand by cyclically shifting the 16-byte data input by a suitable amount. The shift amount in the shifter 34 is decided by a shift amount incrementer 21 and is controlled via a shift amount control line 39 composed of four wires. The shift amount is so decided that the top byte of data required by the execution unit will be positioned at the top byte position of eight bytes to be transferred to the execution unit. This shift may also be omitted. This results in an align operation in the execution unit. Both of the output data lines 35 and 36 of the shifter 34 have capacities of 8 bytes. The output data lines 35 and 36 are respectively connected to fetched data regisers (FDR) 37 and 38 respectively composed of 8 bytes. How to store the data into the FDR 37 and FDR 38 is decided by the state indication unit 92. The state indication unit 92 controls data storing via FDR input control lines 40 and 41 respectively connected to a gate 35a of FDR 37 and a gate 36a of FDR 38. Output data lines 42 and 43 of FDR 37 and FDR 38 respectively have capacities of 8 bytes and are connected to inputs of an operand merge unit 44. The function of the operand merge unit 44 is to merge two 8-byte data in arbitrary byte positions. That is to say, in the case where the former half (or the latter half) of the desired 8-byte data exists in FDR 37 and the latter half (or the former half) of the 8-byte data exists in FDR 38, the operand merge unit 44 selects the former half (or the latter half) of the data from the output data line 42 of FDR 37 and selects the latter half (or the former half) of the data from the output data line 43 of FDR 38 to generate the desired 8-byte operand. How to merge the data in the operand merge unit 44 is decided by a merge control unit 80 via line 81. The output of the operand merge unit 44 is connected to the execution unit which is not illustrated via an operand data line 45 having a capacity of 8 bytes FIG. 5 shows the internal construction of the operand merge unit 44. In FIG. 5, each of the selector circuits (SEL) 440 to 447 selects one of two 1-byte data input to output one byte. Eight bytes carried by the output data line 42 of FDR 37 are distributed among data lines 420 to 427 respectively carrying one bit. Each of the data lines 420 to 427 is connected to one input of the corresponding one of SEL 440 to 447. In the same way, eight bytes carried by the output data line 43 of FDR 38 are distributed among data lines 430 to 437 respectively carrying one bit. Each of the data lines 430 to 437 is connected to the other input of the corresponding one of SEL 440 to 447. A data line and SEL are associated with a particular byte position. For example, the data lines 420 and 430 as well as SEL 440 are associated with the byte 0 and the data lines 421 and 431 as well as SEL 441 are associated with the byte 1. The SEL 440 to SEL 447 are controlled by eight control lines 810 to 817 jointly composing a merge control line 81. Each of the control lines 810 to 817 is associated with one of the SEL 440 to SEL 447. Taking SEL 440 as an example, it selects the data line 420 to be connected to a data line 450 when the control line 810 is in the OFF state and it selects the data line 430 to be connected to the data line 450 when the control line 810 is in the ON state. Data lines 451 to 457 are fed with data in the same way. Thus, the operand merge unit 44 can merge data on the data line 42 with data on the data line 43 for an arbitrary byte position. The output lines 450 to 457 of the operand merge unit jointly form a 8-byte data line 45.

Referring to FIG. 4 again, the inputs to the state indication unit 92 are an accept line 82 for informing that the operand fetch request has been received, an in-memory line 83 for informing that the requested data has already been registered in the memories 19 and 20, an operand address line 46 for conveying bits 28 and 29 of the address of the requested operand, clock lines 84 and 85, and a reset line 86. Here, it is assumed that the operand address is composed of the eighth bit to the thirty-first bit and the zeroth bit to the seventh bit are not used. Therefore, the bit 28 indicates whether the 8-byte block is odd or even and the bit 29 indicates the former half or the latter half of the eight bytes. The state indication unit 92 determines the operand fetch operation according to the above described inputs and has as its outputs in addition to the MDR input control line 30 and the FDR input control lines 40 and 41, a shift increment amount control line 87 for controlling the increment amount in the shift amount incrementer 31, state indication lines 88, 89 and 90 for controlling the merge decision circuit, and an advance line 91 for informing the execution unit of operand transmission. A memory address generator 47 has the operand address line 46 extending from the execution unit as its input and has memory address lines 48 and 49 as its output. Since the function of the memory address generator 47 is the same as that of the conventional memory address generator 15 described in FIG. 1, detailed description will be omitted.

The novelty of the memory control unit illustrated in FIG. 4 as compared with the memory control unit described in FIG. 1 is found in the existence of the shifter 34, FDR 37, FDR 38, the operand merge unit 44 and the operand fetch control unit 29.

The method for fetching a long operand by the memory control unit illustrated in FIG. 4 will be hereinafter described referring to FIG. 2. As already described, an operand which is 40 bytes long is illustrated in FIG. 2a. The memory control unit illustrated in FIG. 4 sends out this operand in five steps as illustrated in FIG. 2c to the execution unit. In step (1), 8-byte blocks 0 and 1 are fetched respectively from the memories 19 and 20 and simultaneously stored into MDR 27 and MDR 28. Effective parts A, B and C of the operand are shaded in FIG. 2c and they are displaced by the shifter 34 so that part A of the operand may be stored into bytes 0 to 4 of the FDR 37 and thereafter stored into the FDR 37 and FDR 38. Since the first 8 bytes A and B of the operand are stored in FDR 37, the first 8 bytes A and B of the operand are taken out from the FDR 37 by the operand merge unit 44 to be transferred to the execution unit. In step (2), 8-byte blocks 2 and 3 are fetched and at the same time stored into MDR 27 and MDR 28. At this instant, the contents when the step (1) has been finished remains in the FDR 38. Therefore, the contents C of the latter half of the 8-bytes block 1 which has been saved still remains in FDR 38. The second 8 bytes within the operand are composed of C and D. The fact that the left half (C) of the second 8 bytes is the contents of the 8-byte block which has been fetched in the preceding step (1) and saved in the FDR 38 is the novelty which is not found in the prior art. In step (2), the content (DEFG) of MDR27, 28 is shifted by four bytes in the right direction (or eleven bytes in left direction) cyclically by the shifter 34 (the result is GDEF). Then, the gate 35a is opened (while the gate 36a is being closed), and (GD) is transferred to FDR37. In step (2) of FIG. 2C, since (G) has nothing to do with this step, (G) is now shown in FDR37. In the other steps also, a similar process occurs. Accordingly, the former half (C) of the second 8 bytes within the operand taken out from FDR 38 and the latter half (D) fetched from FDR 37 are merged by the operand merge unit 44 to be sent out to the execution unit. In step (3), by using the contents of 8-byte blocks 2 and 3 which have been fetched in the preceding step (2) and saved in MDR 27 and MDR 28, the third 8 bytes (E and F) are stored into the FDR 37 via the shifter 34 and selected by the operand merge unit 44 to be sent out to the execution unit. It is also novel that memory reference is not effected in the step (3). In the following steps (4) and (5), remaining parts of the operand are fetched in the same way. However, memory reference is effected only for 8-byte blocks 4 and 5 in the step (4).

In the above described example of FIG. 2, the operand address line 46 assumes the following values in respective steps. The line 46 assumes a value indicating the 8-byte block 0 in the step (1), a value indicating the 8-byte block 2 in the step (2), and a value indicating the 8-byte block 4 in the step (4). These values can be obtained by adopting the operand address itself in the step (1), increasing the value of the operand address by 16 bytes in the step (2), and increasing the value at the preceding step by 8 bytes in the step (3) and the succeeding steps.

Figure 3A:
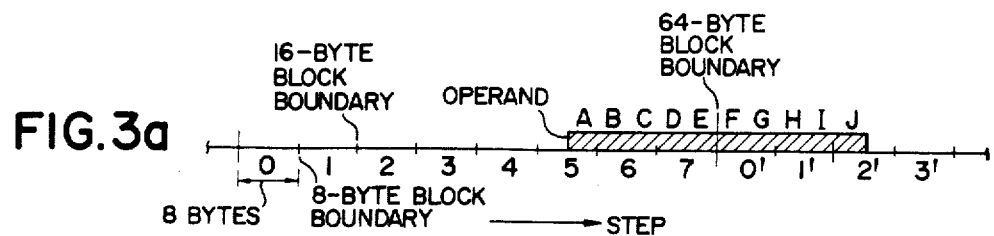
Figure 3B:
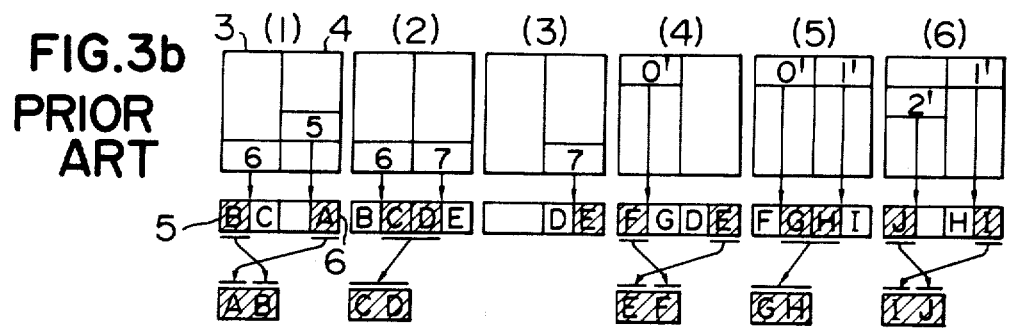
Figure 3C:
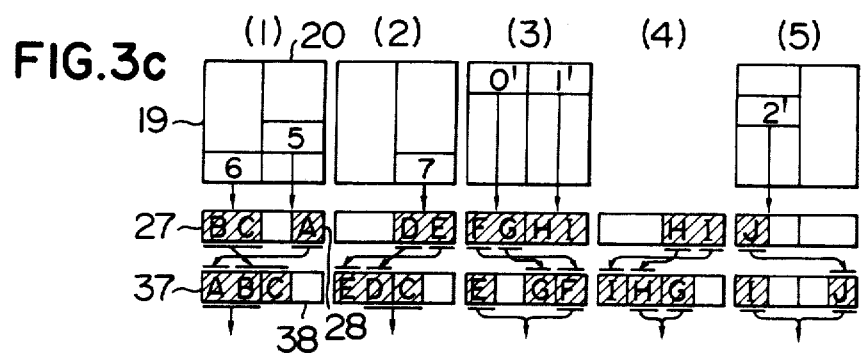

Succeedingly, the BX processing for a long operand by the memory control unit shown in FIG. 4 will be described hereinafter. As described before, FIG. 3a shows the operand which is 40 bytes long and is spread over the boundary between 64-byte blocks. The buffer memory control unit shown in FIG. 4 sends out the operand to the execution unit in five steps as illustrated in FIG. 3c. In the step (1), 8-byte blocks 5 and 6 are fetched and at the same time stored into the MDR 27 and the MDR 28. The effective parts A, B and C of the operand shaded in FIG. 4 are displaced by the shifter 34 to be stored into the FDR 37 and FDR 38. Since the first 8 bytes (A and B) of the operand are stored in the FDR 37, the first 8 bytes (A and B) of the operand are taken out from the FDR 27 by the operand merge unit 44 to be sent out to the execution unit. In the step (2), only the 8-byte block 7 is fetched and stored into the MDR 28. It is because two 8-byte blocks which are spread over the boundary between 64-byte blocks cannot be fetched by memory reference at one time. At this time, the contents of the FDR 38 remain as they were when the step (1) finished. In the FDR 38, therefore, the contents (C) of the latter half of the 8-byte block 6 have been saved. Since the contents (D and E) of the MDR 28 are shifted and stored into the FDR 376 by the shifter 34 in the step (2), the former half (C) of the second 8 bytes within the operand taken out from the FDR 38 by the operand merge unit 44 and the latter half (D) taken out from the FDR 37 are merged to be sent out to the execution unit. In step (3), 8-byte blocks 0' and 1' within another 64-byte block having the latter half of the operand are fetched and stored into MDR 27 and MDR 28. The former half (E) of the third 8 bytes within the operand was already fetched and saved into FDR 37 in the preceding step (2), and the latter half (F) is fetched into the MDR 27 in the present step (3). Accordingly, it is possible to shift the contents of the MDR 27 and store them into the FDR 38 by means of the shifter 34 and thereafter to fetch the parts E and F of the operand, merge them and send them out to the execution unit by the operand merge unit 44.

Since in this step (3) the data extending over the boundary between 64-byte blocks is fetched, the step may be referred to as BX processing. However, the processing is finished in one step. Therefore, memory reference is effected only once and the amount of memory reference is 16 bytes. The number of steps, the number of memory reference times and the amount of memory reference are all decreased as compared with the BX processing comprising steps (2) and (4) in the memory control unit shown in FIG. 1 which has already been described referring to FIG. 3b. This has been acheived owing to the fact that for the BX processing in the step (3) illustrated in FIG. 3c, the left half of the desired part within the operand has already been fetched and saved in the FDR 37 in the preceding step (2) for later use in the step (3). It is noticeable that the original function of the preceding step (2) is to fetch the data preceding the data requiring BX processing in the operand and the preceding step (2) also serves to save the data required for BX processing into the FDR 37 (or 38) at the same time.

The remaining parts of the operand are fetched in succeeding steps (4) and (5). Since the operation is effected in the same way as already described referring to FIG. 2c, further description will be omitted.

In the example shown in FIG. 3c, the operand address line 46 assumes the following values sequentially for respective steps. That is to say, they are the value indicating the 8-byte block 7 in the step (2), the value indicating the 8-byte block 0', and so on. After all, in the same way as FIG. 1c, the values are obtained by adopting the operand address itself in the step (1), incrementing the operand address by 16 bytes in step (2), and incrementing the value at the immediately preceding step by 8 bytes in the step (3) and succeeding steps.

Heretofore, the outline of operation in the memory control unit illustrated in FIG. 4 has been described referring to FIG. 2 and FIG. 3. For realizing a fetch processing for a long operand, suitable input control for MDR 27, MDR 28, FDR 37 and FDR 38 as well as suitable control for the shifter 34 and the operand merge unit 44 are required. In addition, the above described control is also required for the usual short operand fetch and BX processing. Hereafter, the detailed logic system of the operand fetch control unit 29 whereby fetch processing of a long operand as described before referring to FIG. 2 and FIG. 3, usual fetch processing of a short operand and BX processing can be conducted using the memory control unit illustrated in FIG. 4 will be described referring to FIG. 6 and FIG. 7.

In FIG. 4, the operand fetch control unit 29 is composed of the state indication unit 92 for indicating the state of MDR 27, MDR 28, FDR 37 and FDR 38, the shift amount incrementer 31 for controlling the shifter 34, and the merge decision circuit 80 for controlling the operand merge unit 44.

The shift amount incrementer 31 is an incrementer having a 4-bit input. The shift amount incrementer 31 increments the value represented by bits 28 to 31 within the operand address, which is composed of bits 8 to 31 and fed from the operand address line 46, by 8 when the signal on the shift increment amount control line 87 is ON and increments the value by 0 when the signal on the line 87 is OFF. Since the 4-bit incrementer can easily be constructed by using well known technique, the description of the construction method is omitted.

Figure 6:
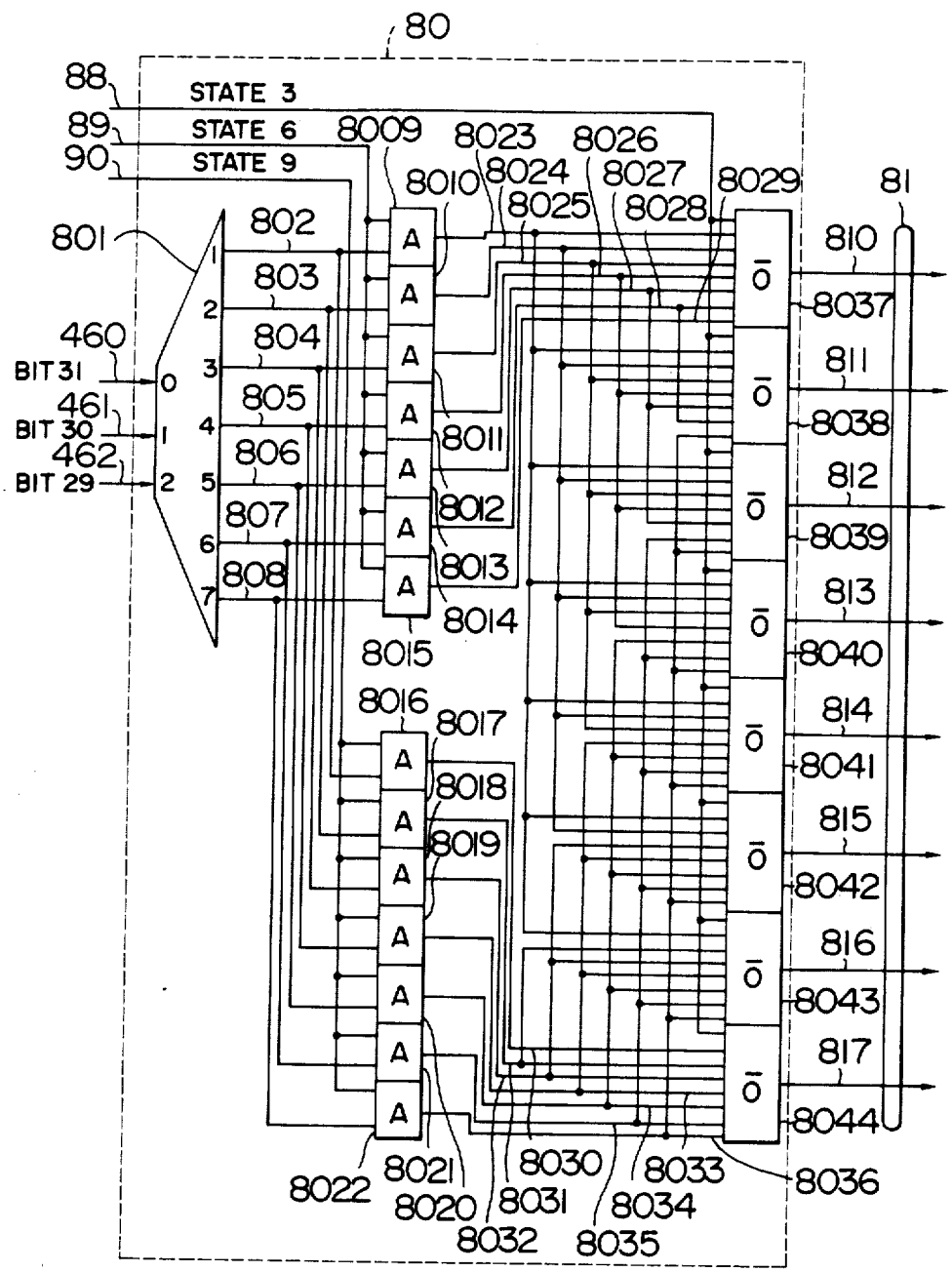
FIG. 6 shows details of a merge decision circuit illustrated in FIG. 4.

FIG. 6 shows the internal construction of the merge decision circuit 80. In FIG. 6, the three least significant bits (bits 29 to 31) on the operand address line 46 are taken out from address lines 460 to 462 and fed to inputs of a three-bit decoder 801. The bits 29 to 31 are respectively associated with the address lines 460 to 462. The decoder 801 decodes the ON or OFF states on the address lines 460 to 462 to yield outputs onto the lines 802 to 808. That is to say, the line 802, 803, 804, - - -, 807 or 808 turns ON respectively when the address bits (29, 30, 31) of the operand are (0, 0, 1), (0, 1, 0), (0, 1, 1), - - -, (1, 1, 0) or (1, 1, 1). The output lines 802 to 808 of the decoder 801 are respectively connected to one of the inputs of AND circuits 8009 to 8015 and also connected to one of the inputs of AND circuits 8016 to 8022. The other of the inputs of AND circuits 8009 to 8015 and the other of the inputs of AND circuits 8016 to 8022 are respectively the state indication lines 89 and 90 fed from the state indication unit 92. The state indication lines 88 to 90 will be described later. The AND circuits 8009 to 8015 convey ON/OFF signals on the lines 802 to 808 to the output lines 8023 to 8029 respectively only when the signal on the state indication line 89 is ON. In the same way, the AND circuits 8016 to 8022 convey ON/OFF signals on the lines 802 to 808 to the output lines 8030 to 8036 respectively only when the signal on the state indication line 90 is ON. OR circuits 8037 to 8044 respectively have eight lines among the line 88 and the lines 8023 to 8036 as their inputs and respectively turn their output lines 810 to 817 to the ON state when one or more inputs are in the ON state. The state indication line 88 is connected to the inputs of all of the OR circuits. When the line 88 is in the ON state, therefore, all of the output lines 810 to 817 simultaneously turn ON. When the state indication line 88 is in the OFF state, the outputs of the OR circuits 8037 to 8044 are determined by the state indication lines 89 and 90 as well as address lines 460 to 462. The state indication lines 88 to 90 never turn ON simultaneously.

Assuming that the state indication line 89 is in the ON state and the address bits (29, 30, 31) are represented as (1, 0, 0), the output line 805 of the decoder 801 turns ON to satisfy the AND condition in the AND circuit 8012, thereby the line 8026 turns ON. Since the line 8026 is connected to inputs of OR circuits 8037 to 8040, the output lines 810 to 813 of OR circuits turn ON. At this time, the other output lines 814 to 817 of the OR circuits remain OFF. The lines 810 to 817 are the merge control lines 810 to 817 respectively for controlling the selector circuits 440 to 447 within the operand merge unit 44 illustrated in FIG. 5. When the state indication line 89 is ON and the address bits (29, 30, 31) are (1, 0, 0) as described in the above example, therefore, bytes 0 to 3 from the FDR 37 are selected to appear on the output lines 450 to 453 of the merge unit 44 and bytes 4 to 7 are selected to appear on the output lines 454 to 457. Other address bit combinations may also be considered in the same way.

Thus, the merge decision circuit 80 having the state indication lines 88 to 90 and the operand address lines 460 to 462 as its inputs may control merging the FDR 37 with the FDR 38 in the operand merge unit 44 placing the boundary in an arbitrary byte position. In FIG. 2 and FIG. 3, examples wherein 4-byte data is merged with 4-byte data are illustrated for simplicity of explanation.

Hereinafter, the state indication unit 92 for indicating the states of MDR 27, MDR 28, FDR 37 and FDR 38 will be described referring to FIG. 7a to FIG. 7d.

Figure 7A:
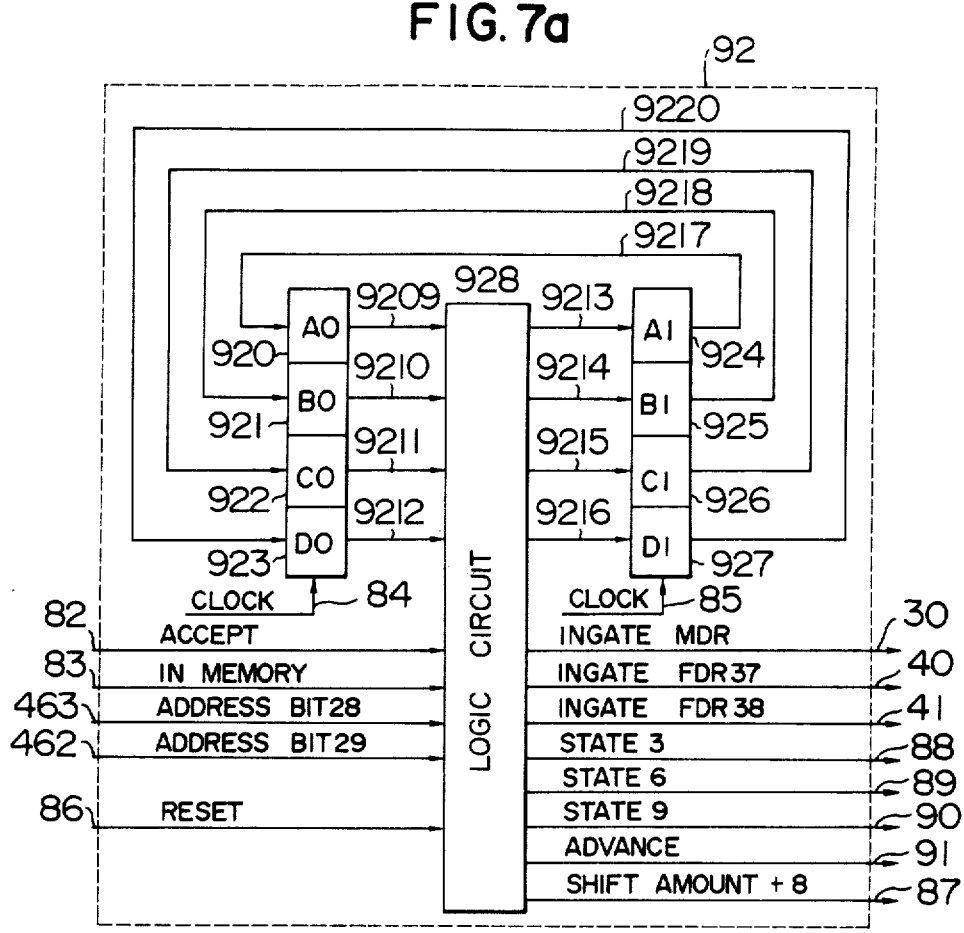
FIG. 7a shows details of a state indication unit illustrated in FIG. 4 and FIGS. 7b-7d are diagrams for explaining the operation thereof.
Figure 7B:
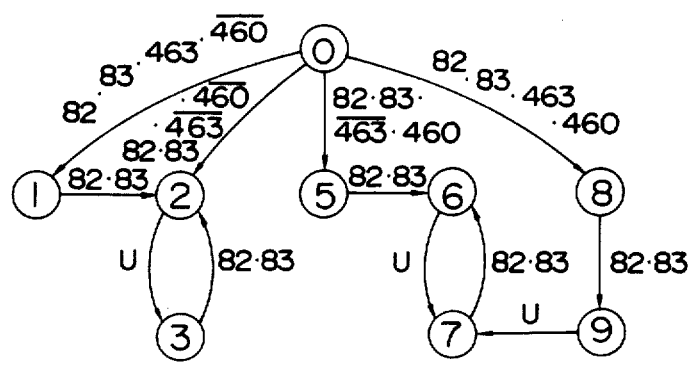
Figures 7C, 7D:
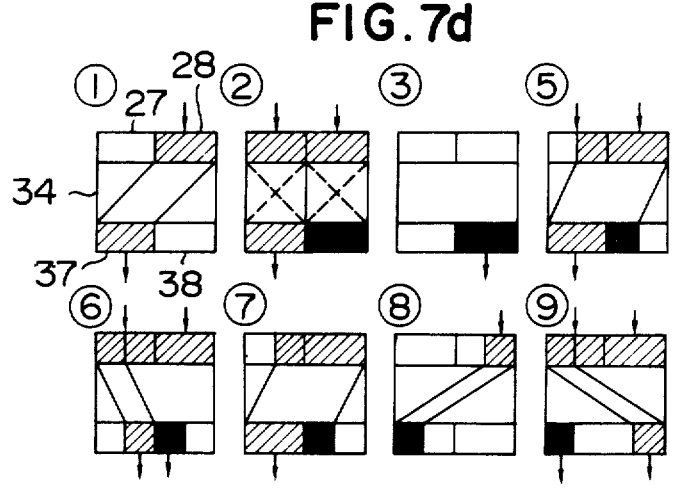

FIG. 7a shows an example of the state indication unit 92. The state indication unit 92 includes flip-flops (FF) 920 to 927 respectively for indicating the states of MDR 27, MDR 28, FDR 37 and FDR 38. The outputs of these flip-flops are designated as A0, B0, C0, D0, A1, B1, C1 and D1, respectively. The $A_i$, $B_i$, $C_i$ and $D_i$ ($i=0, 1$) may compose nine combinations as shown in FIG. 7c respectively designated as states ⓪ to ③ and ⑤ to ⑨. Combinations represented as $A_iB_iC_iD_i=0100$, 1010, 1011, 1100, 1101 and 1111 are not used. The state ⓪ represents a state wherein operand fetch is not effected. In the state ⓪, none of MDR 27, MDR 28, FDR 37 and FDR 38 are busy as represented by "Not Busy" in FIG. 7c. In state ①, the MDR 28 holds an effective 8-byte operand as represented by "Full Busy" in FIG. 7c. In this state ①, the MDR 27, FDR 37 and FDR 38 are "Not Busy", because they do not hold the operand. In the same way, the state ② represents that the MDR 27 and the MDR 28 are "Full Busy" and the FDR 37 and the FDR 38 are "Not Busy", and the state ③ represents that the FDR 38 is "Full Busy" and the other registers are "Not Busy". In the state ⑤, only a part (byte 1 to byte 7) of the operand held by the MDR 27 is effective and the remaining part was either originally ineffective or was effective but has already been used. This is represented by "Half Busy" in FIG. 7c. At this time, the MDR 28 is "Full Busy", and the FDR 37 and FDR 38 are "Not Busy". States of the MDR 27, MDR 28, FDR 37 and FDR 38 are similarly defined also for states ⑥ to ⑨.

FIG. 7d is a pictorial representation of the states defined in FIG. 7c. In FIG. 7d, all of the states ① to ⑨ excluding the state ⓪ are illustrated and a numeral on the upper left of a square represents the state number. One square includes an upper left rectangle for representing the MDR 27, an upper right rectangle for representing the MDR 28, a central rectangle for representing the shifter 34, a lower left rectangle for representing the FDR 37, and a lower right rectangle for representing the FDR 38. Among the MDR 27, MDR 28, FDR 37 and FDR 38, a shaded or dark rectangle represents the "Busy" condition, a rectangle half of which is dark represents the "Half Busy" condition, and a rectangle which is entirely dark represents the "Full Busy" condition. A shaded region represents that it is a cycle during which the operand has been inputted and a dark region represents that the operand was inputted and thereafter it has been held or will be held for a cycle and more. In addition, in a cycle during which the operand has been inputted into the MDR 27 (or MDR 28), the register into which the operand has been inputted is designated by an arrow. In a cycle during which the operand has been fetched from the FDR 37 (or FDR 38), the register from which the operand has been fetched is designated by an arrow. Two lines within the shifter 34 represents shift operation. For example, the two lines in the state ① represents the contents of the MDR 28 have been transferred into the FDR 37. That is to say, the two lines in the state ① represents 8-byte left shift. Transition between the states defined in FIG. 7c is conducted as illustrated in FIG. 7b. Transition is uniquely decided by inputs to a logic circuit 928. And the line in FIG. 7b is provided with the logic expression for the transition. A letter "U" is the abbreviation for "Unconditional" which represents the unique transition in the next cycle. The numerals are those appended to the lines in FIG. 7a.

In FIG. 7a, the inputs to the logic circuit 928 are four output lines 9209 to 9212 of the FF 920 to FF 923, and five extraneous input lines composed of the accept line 82, the in-memory line 83 for representing that the data requested by the execution unit exists in the memory, the address lines 463 and 462, and the reset line 86. According to the above described nine input lines, the logic circuit 928 decides signals on four internal state indication lines 9213 to 9216 for deciding the next state and signals on eight external control lines 30, 40, 41, and 87 to 91. The output signals of the FF 924 to FF 927 are respectively A1, B1, C1 and D1. The signals A1, B1, C1 and D1 are decided by the signals A0, B0, C0 and D0 indicating the state half a cycle before and the above described five external input lines. This decision is conducted in the logic circuit 928 and is conveyed by the internal state indication lines 9213 to 9216 respectively connected to the inputs of FF 924 to FF 927. And the signals A0, B0, C0 and D0 are decided by the state indication signals A1, B1, C1 and D1 half a cycle before and are conveyed through output lines 9217 to 9220 of the FF 924 to FF 927 connected to the inputs of the FF 920 to FF 923. Clock lines 84 and 85 update the contents of the FF 920 to FF 923 and FF 924 to FF 927. The ON phase of the clock line 84 is shifted from that of the clock line 85. The logic of the logic circuit 928 is simple and hence not illustrated. The logic of state transition is illustrated in FIG. 7b and the remaining logic will be hereinafter described.

An external control line 30 of the logic circuit 928 is the MDR input control line 30 illustrated in FIG. 4 which turns ON when the accept line 82 and the in-memory line 83 are both ON and directs to input the operand fetched from the memories 19 and 20 into the MDR 27 and MDR 28. The accept line 82 in the ON state represents that the operand is being fetched and the in-memory line 83 in the ON state represents that the operand is being registered or has been registered in the memories 19 and 20. External control lines 40 and 41 are respectively the control lines 40 and 41 illustrated in FIG. 4 for controlling gates 35a and 36a. When the state represented by A0, B0, C0 and D0 is one of the states ①, ② and ⑤ to ⑧, the FDR input control line 40 turns ON. When the state represented by A0, B0, C0 and D0 is one of the states ②, ⑤, ⑦ and ⑨, the FDR input control line 41 turns ON. If the FDR input control line 40 turns ON, eight left bytes among 16-byte outputs of the shifter 34 are inputted to the FDR 37. If the FDR input control line 41 turns ON, eight rightmost bytes among outputs of the shifter 34 are inputted to the FDR 38.

The state indication lines 88, 89 and 90 turn ON respectively for the states ③, ⑥ and ⑨. When the state indication line 88 is ON, all lines within the merge control line 81 representing the outputs of OR circuits 8037 to 8044 shown in FIG. 6 turn ON. Accordingly, the operand merge unit 44 selects the FDR 38. When the state indication line 89 is ON, AND conditions for the AND circuits 8009 to 8015 shown in FIG. 6 are satisfied. Accordingly, the FDR 38 is selected to the left of the byte boundary determined by the operand address bits 29, 30 and 31 and the FDR 37 is selected to the right of the byte boundary. When the state indication line 90 is ON, AND conditions for the AND circuits 8016 to 8022 are satisfied. Accordingly, the FDR 37 is selected to the left of the byte boundary determined by the operand address bits 29, 30 and 31 and the FDR 38 is selected to the right of the byte boundary.

The advance line 91 turns ON when the state is one of the states ① to ③, ⑤ to ⑦ and ⑨. The advance line 91 is a control line for indicating that eight effective bytes of the operand is fetched from the FDR 37, FDR 38 or both of them and sent out from the operand merge unit 44 to the execution unit through the data line 45. When the advance line 91 is ON, the execution unit may conduct execution using the operand sent through the data line 45.

The shift increase amount control line 87 turns ON when the state is ⑥ or ⑨ and directs the shift amount incrementer 31 to add eight which is represented by "1000" in the binary representation to the bits 28 to 31 on the opeand address line 46. If the line 87 is OFF, nothing or 0 is added to the bits 28 to 31 on the operand address line 46 and the unchanged value is reflected on the shift amount control line 39.

When the reset line 86 which is one of the inputs to the logic circuit 928 is ON, it resets the FF 924 to FF 927 to transit to the state ⓪. Thereby, the state indication unit 92 is initialized.

Figure 8:
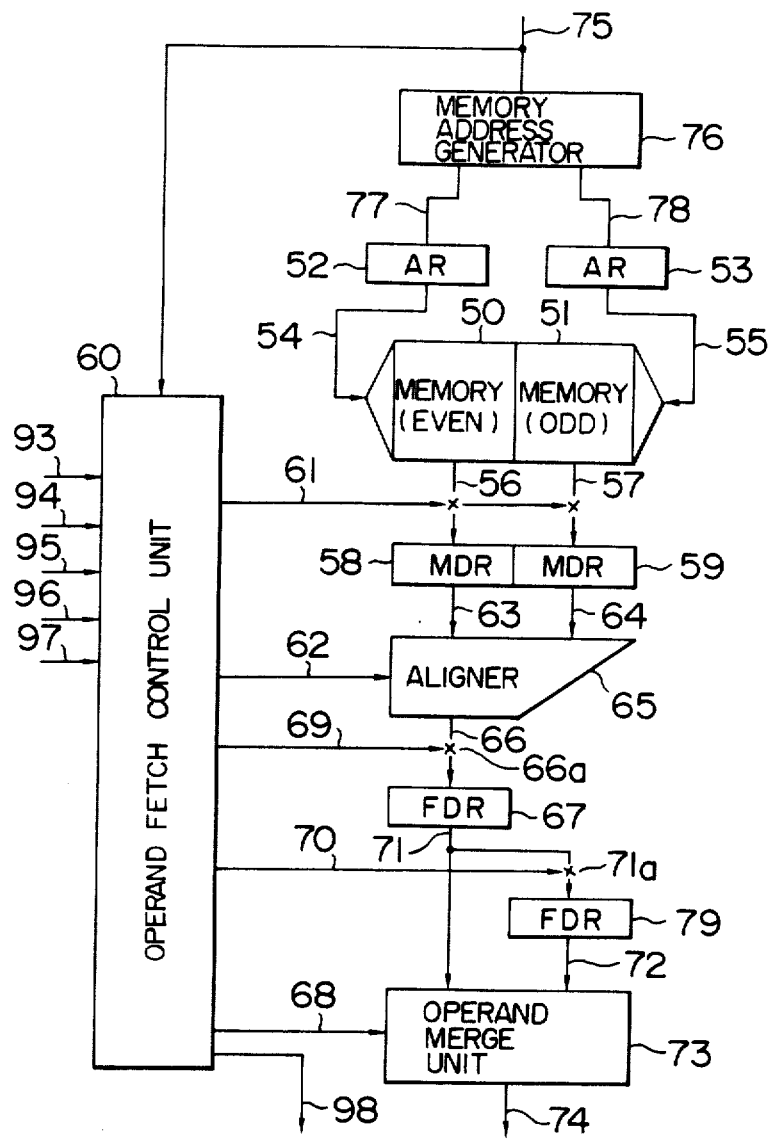
FIG. 8 is a block diagram of another embodiment of the present invention.

FIG. 8 shows another embodiment of the present invention. In the memory control unit illustrated in FIG. 8, a memory address generator 76, address registers 52 and 53, and memories 50 and 51 operate in the same way respectively as the memory address generator 47, the address registers 21 and 22, and memories 19 and 20 already described referring to FIG. 4 and hence further explanation will be omitted.

The 8-byte data fetched from the memory 50 is fed to an 8-byte memory fetch data register (MDR) 58 through a data line 56. The 8-byte data fetched from the memory 51 is fed to an 8-byte MDR 59 through a data line 57. How to store the data into the MDR 58 and MDR 59 is decided by the operand fetch control unit 60. The operand fetch control unit 60 controls data storing via an MDR input control line 61 connected to input control terminals of MDR 58 and MDR 59 as illustrated by marks "x". Output data lines 63 and 64 of MDR 58 and MDR 59 respectively have capacities of 8 bytes and are connected to inputs of an aligner 65. The function of the aligner 65 is similar to that of the aligner 7 shown in FIG. 3 and hence its detailed explanation will be omitted. The operation of said aligner 65 is decided by the operand fetch control unit 60 and is controlled via a shift amount control line 62. An output data line 66 of the aligner 65 has a capacity of 8 bytes and is connected to the input of an 8-byte fetched data register (FDR) 67. An output data line 71 of the FDR 67 has a capacity of 8 bytes and is connected to inputs of another 8-byte fetched data register (FDR) 79 and an operand merge unit 73. An output data line 72 of the FDR 79 has a capacity of 8 bytes and is connected to the input of the operand merge unit 73. How to store the data into the FDR 67 and FDR 79 is decided by the operand fetch control unit 60. The operand fetch control unit 60 controls data storing via FDR input control lines 69 and 70, respectively, connected to a gate 66a for the FDR 67 and a gate 71a of the FDR 79. The function of the operand merge unit 73 is similar to that of the operand merge unit 44 shown in FIG. 4 and hence detailed explanation will be omitted. The operation of the operand merge unit 73 is decided by the operand fetch control unit 60 and is controlled via a merge control line 68. The output of the operand merge unit 73 is connected to the execution unit which is not illustrated via an operand data line 74 having a capacity of 8 bytes.

The memory control unit illustrated in FIG. 8 has the following advantages as compared with the memory control unit described referring to FIG. 4. That is to say, instead of the shifter 34 illustrated in FIG. 4 which shifts the 16-byte input to yield the 16-byte output, the aligner which shifts the 16-byte input to yield the 8-byte output is used. While the input of the FDR 37 and the input of the FDR 38 are both the outputs of the shifter 34 in FIG. 4, the input of the FDR 67 is the output of the aligner 65 and the input of the FDR 79 is the output of the FDR 67 in FIG. 8. As a result, the hardware required for the aligner 65 is reduced by half as compared with that for the shifter 34 illustrated in FIG. 4 and the required data width (8 bytes) on the output data line 66 of the aligner 65 is reduced by half as compared with that (16 bytes) of the shifter 34.

The method for fetching a long operand by the memory control unit illustrated in FIG. 8 will be hereinafter described referring to FIG. 2. As already described, the operand which is 40 bytes long is illustrated in FIG. 2a. The memory control unit illustrated in FIG. 8 sends out this operand in six steps as illustrated in FIG. 2c to the execution unit. In step (1), 8-byte blocks 0 and 1 are fetched respectively out of the memories 50 and 51 to be simultaneously stored into the MDR 58 and MDR 59. Effective parts A, B and C of the operand are shaded in FIG. 2d and they are displaced by the aligner 65 so that the first 8 bytes (A and B) of the operand may be stored into the FDR 67. The first 8 bytes (A and B) of the operand thus stored in the FDR 67 are fetched from the FDR 67 by the operand merge unit 73 to be transferred to the execution unit. In step (2), the part (C) of the operand, which is included in the effective parts (A, B and C) of the operand fetched into the MDR 58 and MDR 59 in the step (2) and is not fetched by the aligner 65, is fetched from the MDR 59 by the aligner 65 and is stored into the FDR 79 via the FDR 67. Succeedingly in step (3), 8-byte blocks 2 and 3 are fetched and at the same time stored into the MDR 58 and MDR 59. At this time, the contents when the step (2) has been completed remains in the FDR 79. Accordingly, the contents (C) of the latter half of the 8-byte block 1 have been saved in the FDF 79. The second 8 bytes of the operand are C and D. The fact that the left half of the second 8 bytes is the contents (C) of the 8-byte block 1 which was fetched in the preceding step (1) and is transferred and saved in the step (2) is a novelty which is not found in the memory control units illustrated in FIG. 1 and FIG. 4. In step (3), the contents (D and G) of the MDR 58 and MDR 59 are shifted and stored into the FDR 67 by the aligner 65. Thus, the former half (C) of the second 8 bytes within the operand is fetched from the FDR 79 and the latter half (D) is fetched from the FDR 67 by the operand merge unit 73. The former half (C) is merged with the latter half (D) by the operand merge unit 73 to be sent out to the execution unit. Also in the step (3), the latter half (G) of the 8-byte block 3 which is stored in the former half of the FDR 67 is transferred into the FDR 79. Succeedingly in step (4), the third 8 bytes (E and F) of the operand included in the contents of 8-byte blocks 2 and 3 which have been fetched in the preceding step (3) and saved in the MDR 58 and MDR 59 are shifted ánd stored into the FDR 67 by the aligner 65 to be sent out to the execution unit. In the steps (2) and (4), memory reference is not effected. In the same way, the remaining parts of the operand are fetched in steps (5) and (6). However, memory reference is effected only in the step (5) for 8-byte blocks 4 and 5.

In the above described example illustrated in FIG. 2, the value of the operand address line 75 can be obtained by adopting the operand address itself in the step (1) and by incrementing the value at the immediately preceding step by 8 bytes in the step (2) and succeeding steps.

Figure 3D:
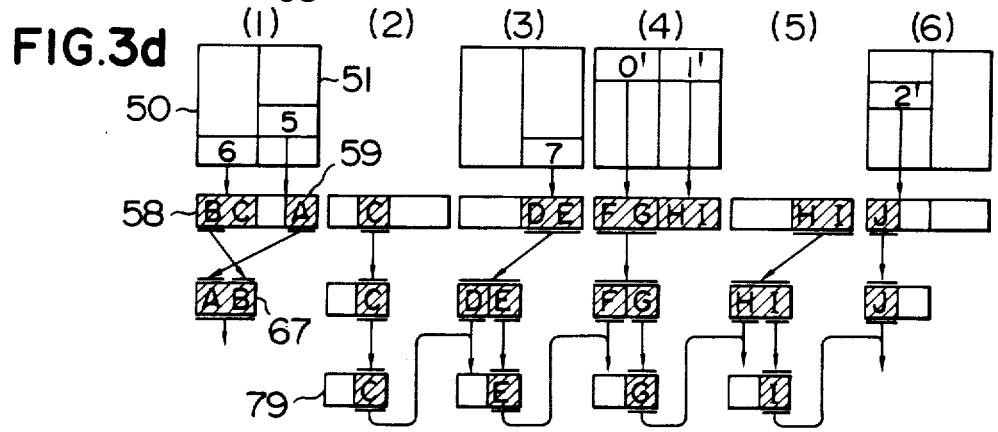

Next, the BX processing for a long operand by the memory control unit illustrated in FIG. 8 will be described referring to FIG. 3. As described before, FIG. 3a shows the operand which is 40 bytes long and is spread over the boundary between 64-byte blocks. The memory control unit shown in FIG. 8 sends out the operand to the execution unit in six steps as illustrated in FIG. 3d. In the step (1), 8-byte blocks 5 and 6 are fetched and at the same time stored into the MDR 58 and MDR 59. The effective parts A, B and C of the operand are shaded in FIG. 3d. The first 8-bytes (A and B) of the operand are displaced and stored into the FDR 67 by the aligner 65. Accordingly, the first 8 bytes (A and B) of the operand are fetched from the FDR 67 by the operand merge unit 73 to be sent out to the execution unit. In step (2), the part (C), which was included in the effective parts (A, B and C) of the operand fetched into the MDR 58 and MDR 59 and was not fetched by the aligner 65, is fetched from the MDR 58 by the aligner 65 and stored in the FDR 79 via the FDR 67. Succeedingly in step (3), only 8-byte block 7 is fetched and stored into the MDR 59. As described before referring to FIG. 4, this is done because two 8-byte blocks extending over the boundary between 64-byte blocks cannot be fetched by memory reference at a time. At this time, the contents of the FDR 79 remain as they were when the step (2) finished. In the FDR 79, therefore, the contents (C) of the latter half of the 8-byte block 6 have been saved. Since the contents (D and E) of the MDR 59 are shifted and transferred to the FDR 67 by the aligner 65, the former half (C) of the second 8 bytes within the operand fetched from the FDR 79 and the latter half (D) taken out from the FDR 67 are merged by the operand merge unit 73 to be sent out to the execution unit. Also in the step (3), the part (E) which is included in the effective parts (D and E) of the operand fetched into the FDR 67 in the step (3) and is not fetched by the operand merge unit 73 is transferred to the FDR 79. In step (4), 8-byte blocks 0' and 1' within another 64-byte block having the latter half of the operand are fetched and stored into MDR 58 and MDR 59. The former half (E) of the third 8 bytes within the operand was already saved into the FDR 79 in the peceding step (3), and the latter half (F) is fetched into the MDR 58 in the present step (4). Accordingly, it is possible to select the contents of the MDR 58 and transfer them to the FDR 67 by the aligner 65 and thereafter to fetch the parts E and F of the operand and merge them by the operand merge unit 73 to be sent out to the execution unit.

Since in the step (4) the data extending over the boundary between 64-byte blocks is fetched, the step may be referred to as BX processing. However, the processing is finished in one step in appearance. Therefore, memory reference is effected only once and the amount of memory reference is 16 bytes. It may be said that this processing system is about the same grade as the BX processing by the memory control unit shown in FIG. 4 which was already described referring to the step (3) in FIG. 3c. This has been achieved owing to the fact that for the BX processing in the step (4) shown in FIG. 3d by using the memory control unit shown in FIG. 8, the left half of the desired part within the operand was fetched in the step (1) which precedes by two steps and was saved into the FDR 79 in the step (2) which precedes by one step for use in the step (4). It is noted that the original function of the previous step (1) is to fetch the data preceding the data requiring the BX processing in the operand and the previous step (1) also serves to save the data required for BX processing into the FDR 79 at the same time.

The remaining parts of the operand are fetched in succeeding steps (5) and (6). Since the operation is effected in the same way as already described referring to FIG. 2d, further description will be omitted.

In the example shown in FIG. 3d, the operand address line 75 assumes the following values sequentially for respective steps. That is to say, they are the value indicating the 8-byte block 5 in the step (1), the value indicating the 8-byte block 7 in the step (3), the value indicating the 8-byte block 0' in the step (4), and so on. After all, in the same way as FIG. 2d, the values are obtained by adoping the operand address itself in the step (1), incrementing the operand address by 16 bytes in the step (3), and incrementing the value at the immediately preceding step by 8 bytes in the step (4) and succeeding steps.

In FIG. 8, the inputs to the operand fetch control unit 60 are an accept line 93 for indicating that an operand fetch request has been accepted, an in-memory line 94 for indicating that the requested data have been already registered in the memories 50 and 51, an operand address line 95 for conveying bits 28 to 31 in the address of the requested operand, clock lines 95 and 96, and a reset line 97. The operand fetch unit 60 determines the operand fetch operation according to the above described inputs and has as its outputs in addition to the MDR input control line 61 as well as the FDR input control line 69 and 70, a shift amount control line 62 for controlling the shift amount in the aligner 65, a merge control line 68 for controlling the operation of the operand merge unit 73, and an advance line 98 for informing the execution unit of operand transmission. The operand fetch control unit 60 can be constructed in the same way as the operand fetch control unit 29 shown in FIG. 4. Accordingly, its internal constitution will not be described.

As evident from the foregoing description, memory reference amount required to fetch a long operand from the memory according to the present invention is about half that of the conventional data processing system having an alignment mechanism.

When a long operand having an address which is not a multiple of 8 bytes is fetched in the prior art, the BX processing is required in a ratio of once out of eight times, an extra memory reference request is issued at each BX processing, and memory reference for the extra 16 bytes is effected. In other words, the number of request times is incremented by approximately 13% and the memory reference amount is incremented by approximately 125% as compared with the case according to the present invention.

What is claimed is:

1. A memory control system for effecting an access to a memory to fetch from said memory a data block specified by an address signal received from an execution unit which operates on data in a predetermined unit length, and for obtaining from the fetched data block a unit length of data to be supplied to said execution unit, a unit length of data as operated on by said execution unit being shorter than the length of a data block read out of said memory in one access, said system comprising:

first hold means for holding the specified data block read out from said memory at each memory access, the capacity of said first hold means corresponding to the length of a single data block fetched from said memory;

second hold means for holding data and having the same capacity as said first hold means;

data fetch means for fetching portions of the data block from said second hold means in a predetermined order, which portions each correspond to a unit length of data as operated on by said execution unit, and for supplying the fetched data portions to said execution data;

gate means for selectively gating all or part of the data in the data block held in said first hold means in a predetermined order to a portion of said second hold means from which data has already been fetched by said data fetch means, so that data gated to said second hold means is retained by said second hold means along with any remaining data not yet fetched by said data fetch means; and control means for controlling said gate means and said data fetch means on the basis of said address signal.

2. A memory control system according to claim 1, wherein said control means includes state indication means for indicating the state of the data held in said first hold means and said second hold means in response to at least a portion of said address signal, and gate control means for controlling said gate means depending upon the state indication by said state indication means.

3. A memory control system according to claim 2, wherein said control means includes means for controlling said data fetch means depending upon said state indication and said address signal.

4. A memory control system according to claim 1, wherein a shift means is provided between said first hold means and said gate means for cyclically shifting the data block held by said first hold means to be outputted via said gate means to said second hold means, and said control means includes means for controlling the shift amount of data in said shift means.

5. A memory control system according to claim 4, wherein said control means controls said shift amount of data depending upon said state indication and said address signal.

6. A memory control system according to claim 5, wherein said control means controls the shift amount of data in said shift means so that data corresponding to said unit length of data required by said execution unit would be placed in specified positions within said second hold means.

7. A memory control system according to claim 1, wherein said memory comprises two memory banks which can operate independent of each other, the fetched data width of each memory bank being equal to said unit length of data, and said gate means includes first and second gates for selectively gating all of the data within a data block held by said first hold means or a part of said data having the data width which is equal to said unit length of data to said second hold means.

8. A memory control system according to claim 7, wherein said control means includes state indication means for indicating the state of the data held in said first hold means and said second hold means in response to at least a portion of said address signal, and gate control means for controlling said gate means depending upon the state indication by said state indication means.

9. A memory control system according to claim 8, wherein said control means includes means for controlling said data fetch means depending upon said state indication and said address signal.

10. A memory control system according to claim 7, wherein a shift means is provided between said first hold means and said gate means for cyclically shifting the data block held by said first hold means to be outputted via said gate means to said second hold means, and said control means includes means for controlling the shift amount of data in said shift means.

11. A memory control system according to claim 10, wherein said control means controls said shift amount of data depending upon said state indication and said address signal.

12. A memory control system according to claim 11, wherein said control means controls the shift amount of data in said shift means so that data corresponding to said unit length of data required by said execution unit would be placed in specified positions within said second hold means.

* * * * *